(12) United States Patent
Hungr et al.

(10) Patent No.: US 12,453,835 B2
(45) Date of Patent: Oct. 28, 2025

(54) HUMIDIFICATION DEVICE FOR A POSITIVE AIRWAY PRESSURE BREATHING APPARATUS

(71) Applicant: SLEEPINNOV TECHNOLOGY, Moirans (FR)

(72) Inventors: Nikolai Hungr, Moirans (FR); Jérôme Argod, Moirans (FR)

(73) Assignee: SLEEPINNOV TECHNOLOGY, Moirans (FR)

( * ) Notice: Subject to any disclaimer, the term of this patent is extended or adjusted under 35 U.S.C. 154(b) by 716 days.

(21) Appl. No.: 17/784,769

(22) PCT Filed: Dec. 9, 2020

(86) PCT No.: PCT/EP2020/085390
§ 371 (c)(1),
(2) Date: Jun. 13, 2022

(87) PCT Pub. No.: WO2021/116235
PCT Pub. Date: Jun. 17, 2021

(65) Prior Publication Data
US 2022/0409844 A1    Dec. 29, 2022

(30) Foreign Application Priority Data
Dec. 13, 2019 (FR) ...................... 1914406

(51) Int. Cl.
*A61M 16/16* (2006.01)
*A61M 16/00* (2006.01)
*A61M 16/08* (2006.01)

(52) U.S. Cl.
CPC ........ *A61M 16/16* (2013.01); *A61M 16/0066* (2013.01); *A61M 16/0875* (2013.01); *A61M 2205/42* (2013.01)

(58) Field of Classification Search
None
See application file for complete search history.

(56) References Cited

U.S. PATENT DOCUMENTS

| 9,010,324 B2 | 4/2015 | Martin et al. |
| 2003/0066526 A1* | 4/2003 | Thudor ............... A61M 16/161 |
| | | 128/203.26 |

(Continued)

FOREIGN PATENT DOCUMENTS

| CA | 2859994 A1 | 3/2015 |
| EP | 2540335 A1 | 1/2013 |

(Continued)

OTHER PUBLICATIONS

International Search Report for International Application No. PCT/EP2020/085390, mailed Jan. 19, 2021, 8 pages (with English Translation).

(Continued)

*Primary Examiner* — Joseph D. Boecker
*Assistant Examiner* — Thomas W Greig
(74) *Attorney, Agent, or Firm* — TraskBritt

(57) ABSTRACT

A respiratory ventilation device—for sending a fan-generated air flow into a duct extending to a respiratory mask—extends between lower (bottom) and upper ends. A ventilation chamber contains the fan and is connected to a humidifier, which has a water-accommodating reservoir and a connecting chamber adjacent the ventilation chamber. An intake opening leads out of the ventilation chamber. An exhaust opening leads into an exhaust channel attachable to the duct. A humidification chamber has the water reservoir. First and second openings are formed between the connecting and humidification chambers. The connecting chamber extends between the humidification and ventilation chambers. A separating wall extends between the connecting and humidification chambers. The first and second openings are (Continued)

made in the separating wall, which is arranged such that the humidification chamber extends between the bottom and the separating wall. The connecting chamber extends between the separating wall and the ventilation chamber.

17 Claims, 7 Drawing Sheets

(56) References Cited

U.S. PATENT DOCUMENTS

| | | | | |
|---|---|---|---|---|
| 2004/0055597 | A1* | 3/2004 | Virr | A61M 16/16 128/203.12 |
| 2008/0257346 | A1* | 10/2008 | Lathrop | A61M 16/0066 181/224 |
| 2010/0132708 | A1* | 6/2010 | Martin | A61M 16/0066 128/204.21 |
| 2011/0155132 | A1* | 6/2011 | Virr | A61M 16/1075 128/203.26 |
| 2016/0022954 | A1* | 1/2016 | Bath | A61B 5/0816 128/203.12 |
| 2016/0206847 | A1 | 7/2016 | Wang et al. | |
| 2017/0319811 | A1* | 11/2017 | Foote | A61M 16/142 |
| 2022/0111163 | A1 | 4/2022 | Hungr et al. | |
| 2023/0241343 | A1* | 8/2023 | Sharma | A61M 16/0633 128/203.27 |

FOREIGN PATENT DOCUMENTS

| | | |
|---|---|---|
| EP | 2703034 B1 | 5/2017 |
| FR | 3068610 B1 | 1/2019 |
| FR | 3081713 A1 | 12/2019 |
| FR | 3092253 B1 | 2/2021 |
| WO | 2015/103904 A1 | 7/2015 |
| WO | 2019/111110 A1 | 6/2019 |

OTHER PUBLICATIONS

International Written Opinion for International Application No. PCT/EP2020/085390, mailed Jan. 19, 2021, 9 pages (with English Machine Translation).

* cited by examiner

HUMIDIFICATION DEVICE FOR A POSITIVE AIRWAY PRESSURE BREATHING APPARATUS

CROSS-REFERENCE TO RELATED APPLICATIONS

This application is a national phase entry under 35 U.S.C. § 371 of International Patent Application PCT/EP2020/085390, filed Dec. 9, 2020, designating the United States of America and published as International Patent Publication WO 2021/116235 A1 on Jun. 17, 2021, which claims the benefit under Article 8 of the Patent Cooperation Treaty to French Patent Application Serial No. FR1914406, filed Dec. 13, 2019.

TECHNICAL FIELD

The technical field of the disclosure is a device for ventilation by continuous positive airway pressure. This type of device is commonly used in the treatment of sleep apnea.

BACKGROUND

The use of ventilation by continuous positive airway pressure (CPAP) constitutes a reference treatment in the field of sleep apnea. This treatment consists in continuously blowing air into a mask applied to a user's face. It may be a nose, nasal or face mask. The stream of air reaches the user's respiratory tract, exerting sufficient pressure thereon to prevent the formation of a collapse. The air blown in is generated by a breathing device employing continuous positive airway pressure, this type of apparatus having a fan for generating a flow of air in the direction of the mask.

In order to improve ease of use, certain breathing devices employing continuous positive airway pressure may have a humidifier. The humidifier has a water reserve. It is configured in such a way that the air circulates above the water reserve before being sent into a duct leading into the mask.

Document EP2703034 describes a ventilation device that may have a humidifier. The same applies for document EP2540335 or document FR3068610.

In the device described in U.S. Pat. No. 9,010,324, a ventilation chamber is superposed on a humidifier. In this device, the humidifier has a complex shape, and is not easily accessible. This makes cleaning or filling not very practical. Moreover, during use, the electronic circuit is located below the humidifier, which is not optimal from the perspective of safety in use. The inventors have designed a CPAP positive ventilation device, taking into account the following aims:
have a compact device;
limit the noise caused by the flow of air in the device;
obtain good safety in use, including in the event of the device being knocked over;
optimize the cost and simplicity of manufacture;
make the filling and cleaning easier;
propose a device with a shape that permits other uses.

The inventors designed the device described below, which meets these aims.

BRIEF SUMMARY

The disclosure relates to a respiratory ventilation device, intended to send a flow of air, generated by a fan, into a duct, the duct extending between the device and a respiratory mask, intended to be worn by a user, the device extending between a lower end, forming a bottom, and an upper end, the device having:
a ventilation chamber, containing the fan;
a humidifier, connected to the ventilation chamber, and intended to humidify the air blown in by the fan, the humidifier having a reservoir intended to accommodate water,
the humidifier having:
a connecting chamber, adjacent to the ventilation chamber, and comprising:
an intake opening, leading out of the ventilation chamber;
an exhaust opening, leading into an exhaust channel, the exhaust channel being configured to be attached to the duct;
a humidification chamber, having the reservoir;
a first opening and a second opening, separate from one another, formed between the connecting chamber and the humidification chamber.

The device may have at least one of the following features, taken individually or in technically feasible combinations:
the connecting chamber extends between the humidification chamber and the ventilation chamber;
the device has a separating wall extending between the connecting chamber and the humidification chamber, the first opening and the second opening being made in the separating wall, the separating wall being arranged such that:
the humidification chamber extends between the bottom and the separating wall;
the connecting chamber extends between the separating wall and the ventilation chamber.

The device may have an annular lateral wall, connecting the lower end to the upper end, such that the connecting chamber, the humidification chamber and the ventilation chamber are delimited by the annular lateral wall.

The connecting chamber may define a first channel between the intake opening and the first opening, and also a second channel between the second opening and the exhaust opening, such that:
the first channel is arranged to direct air from the ventilation chamber through the intake opening to the humidification chamber, through the first opening;
the second channel is arranged to direct air from the humidification chamber through the second opening to the exhaust opening.

The second channel may define a path through the connecting chamber, the path having multiple bends between the second opening and the exhaust opening. According to one embodiment:
the first channel extends between two first transverse walls, each first transverse wall extending between the separating wall and an upper wall of the connecting chamber;
and/or the second channel extends between two second transverse walls, each second transverse wall extending between the separating wall and the upper wall of the connecting chamber;
the connecting chamber extends between the separating wall and the upper wall of the connecting chamber;
each first transverse wall and/or each second transverse wall extends from the upper wall of the connecting chamber.

According to one embodiment, an opening, chosen from among the intake opening and the first opening, is associated with a shutter, the shutter being configured to pass from an open position, in which the opening is open, and a closed position, in which the opening is closed, when the device is tilted beyond a critical inclination with respect to a reference position of the device. The shutter may be able to switch between the open position and the closed position by gravity.

According to one embodiment, the device has an inclinometer, configured to measure an angle of inclination of the device with respect to a reference position of the device, the inclinometer being connected to a circuit breaker, the inclinometer being configured to activate the circuit breaker so as to interrupt operation of the fan when the device is tilted beyond a critical inclination with respect to a reference position of the device.

According to one embodiment, the annular lateral wall extends about a transverse axis, extending between the bottom and the upper end. The annular wall may be cylindrical or frustoconical.

The reference position of the device may be such that the transverse axis is vertical, or vertical to within an angular tolerance, for example ±25° or ±45° or 60°.

According to one embodiment, the water reservoir extends, in the humidification chamber, between the bottom of the device and the separating wall. The water reservoir may be removable, such that it can be taken out of the humidification chamber or inserted into the latter. The water reservoir is preferably withdrawn from or inserted into the humidification chamber by being moved in translation parallel to the bottom.

According to one embodiment, the exhaust opening leads into an angled exhaust channel.

The humidifier is preferably removable, so that it can be separated from the ventilation chamber of the device.

The humidifier may form a base of the device, the ventilation chamber being arranged on the humidifier.

According to one embodiment:
the connecting chamber is delimited by an upper wall, the upper wall being adjacent to the ventilation chamber;
the upper wall is removable.

The disclosure will be better understood on reading the description of the exemplary embodiments, which are described, in the rest of the description, with reference to the figures listed below.

DETAILED DESCRIPTION

Figure 1A:
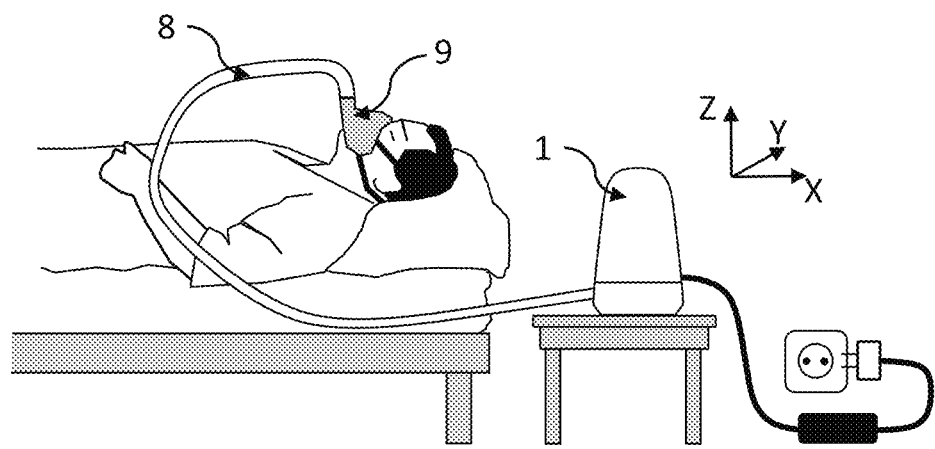
FIG. 1A shows an example of use of the device.

FIG. 1A shows a device 1 for aiding respiration according to embodiments of the disclosure. The device comprises a duct 8, connecting it to a respiratory mask 9 intended to be applied to the face of a user. Preferably, the duct 8 is a flexible duct with a length of a few meters. The device 1 comprises a ventilation chamber 5, containing a fan. The latter is controlled to maintain a setpoint pressure in the respiratory mask. It is essentially intended for use at night. When it is being used, the device can notably be placed on a planar support, for example a bedside table.

Figure 1B:
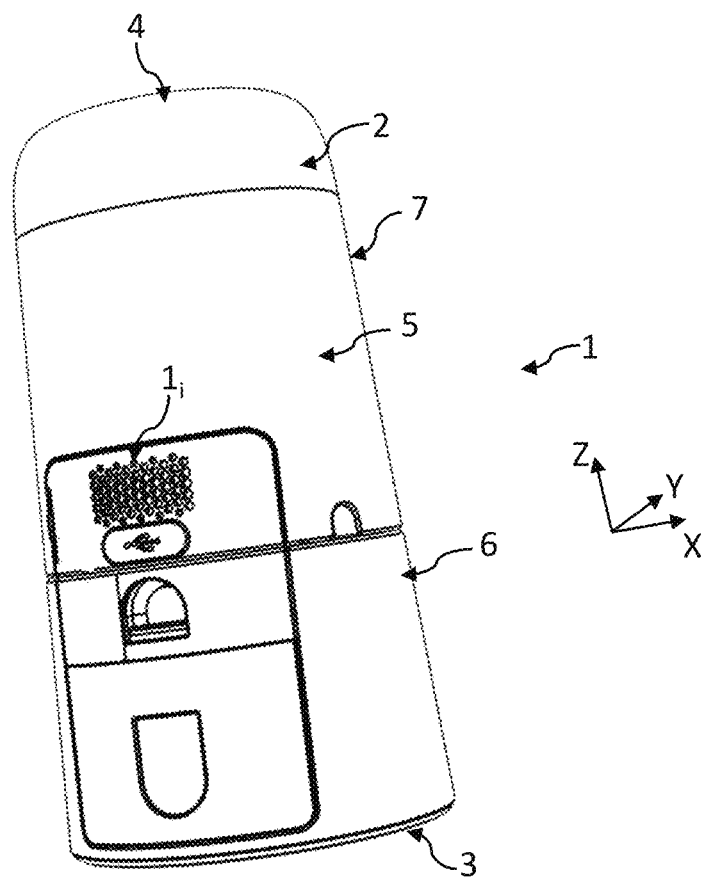
FIG. 1B shows an overview of the device.

FIG. 1B is an overview of the device. The device extends along a transverse axis Z between a lower end 3, forming a bottom, and an upper end 4. The distance between the bottom 3 and the upper end 4 may be between 10 cm and 40 cm. It is, for example, equal to 30 cm. The bottom 3 preferably extends through a base plane $P_{XY}$, defined by axes X and Y. The bottom may be circular, for example. Through the base plane XY, the bottom is inscribed in a diameter preferably less than 15 cm or 30 cm. The dimensions of the device make it easily transportable. Furthermore, the device is designed to be placed on a planar support with small dimensions, for example a table. During use, the transverse axis Z is preferably parallel to the vertical, whereas the base plane XY is horizontal.

In the example shown, the device 1 is contained in an enclosure 2. The latter is preferably made from a rigid material, for example a plastic. More specifically, between the bottom 3 and the upper end 4, the device is delimited radially by a lateral wall 7, extending about the transverse axis Z. The device has an air inlet $1_i$ and an air outlet $1_o$. The air taken in through the air inlet $1_i$ is directed toward the fan in the ventilation chamber 5, the latter generating an air flow circulating in the device 1, up to an air outlet $1_o$, the latter being attached to the duct 8.

The device may have a pressure sensor, measuring the air pressure between the fan and the air outlet $1_o$. Depending on the pressure measured, a control unit adapts the power of the fan so as to maintain a pressure that is as stable as possible around a setpoint pressure.

The ventilation chamber 5 is superposed on a humidifier 6. Depending on the direction of the air flow, the humidifier is arranged below the ventilation chamber. The humidifier 6 thus forms a base of the device 1. In this way, the ventilation chamber 5 and the humidifier 6 are superposed. The humidifier 6 may be removable so as to be able to be separated from the ventilation chamber 5 when the device is not in use. This can make it possible for the device to be particularly compact, notably when it is being transported.

Figure 1C:
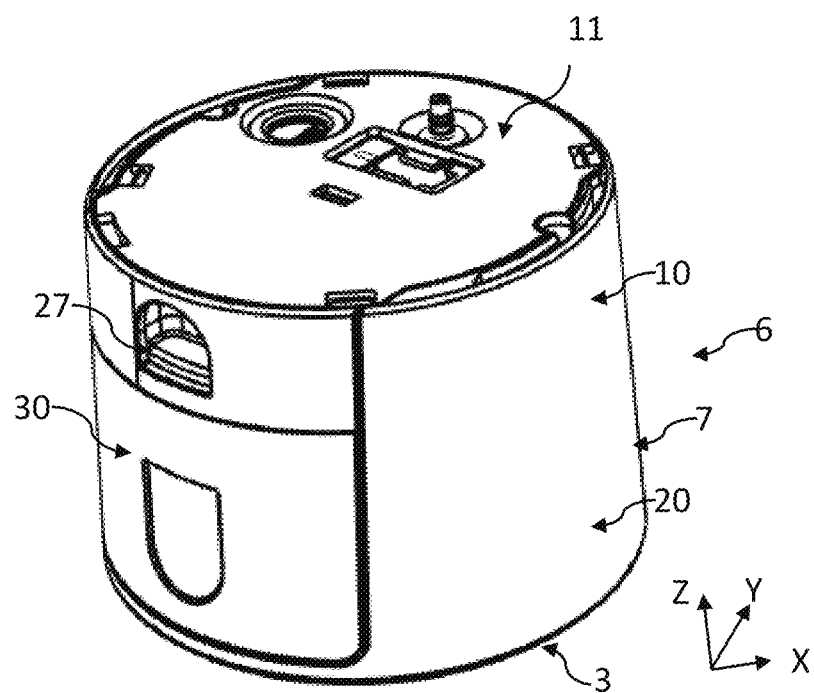
FIG. 1C shows a humidifier, which is part of the device.
Figure 1D:
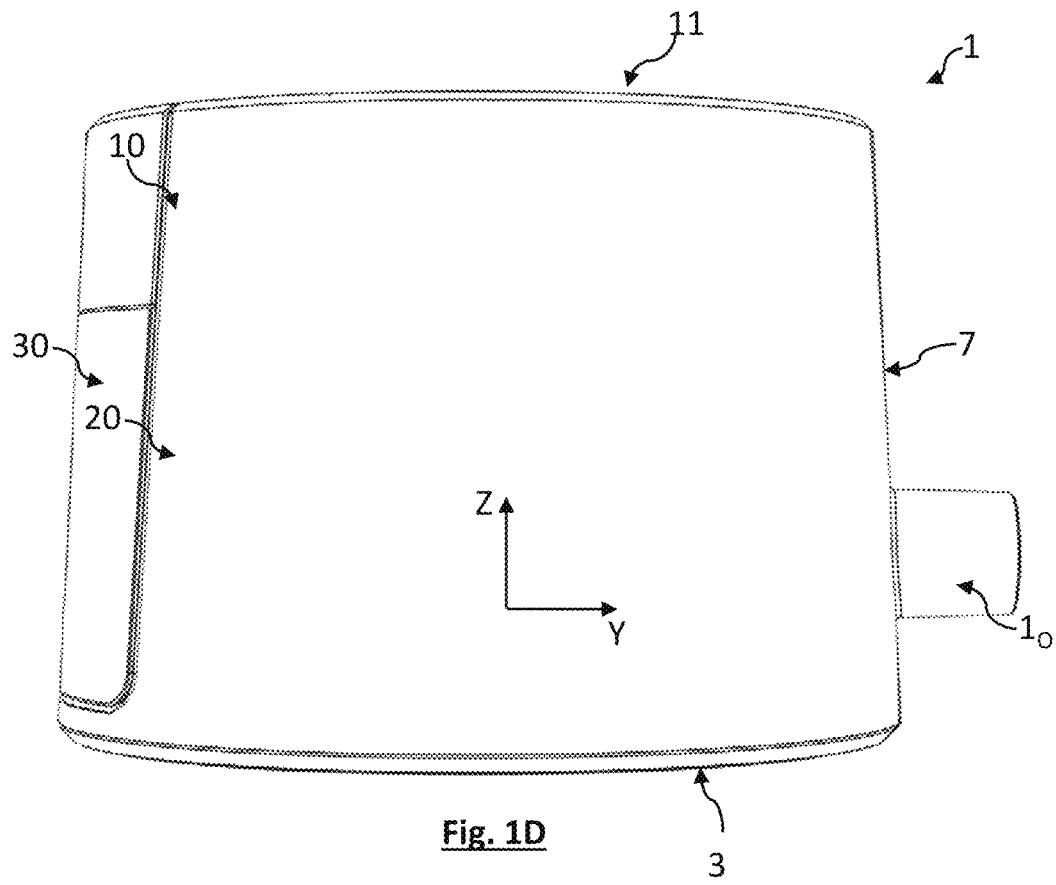
FIG. 1D is a section, through a plane YZ, of the humidifier.

FIGS. 1C and 1D show the humidifier 6. The latter is configured to be fixed below the ventilation chamber 5. The humidifier 6 has a connecting chamber 10 superposed on a humidification chamber 20. The humidification chamber 20 has a removable water reservoir, which can be withdrawn from or inserted into the device via a flap 30, provided in the continuity of the lateral wall 7.

Figure 2A:
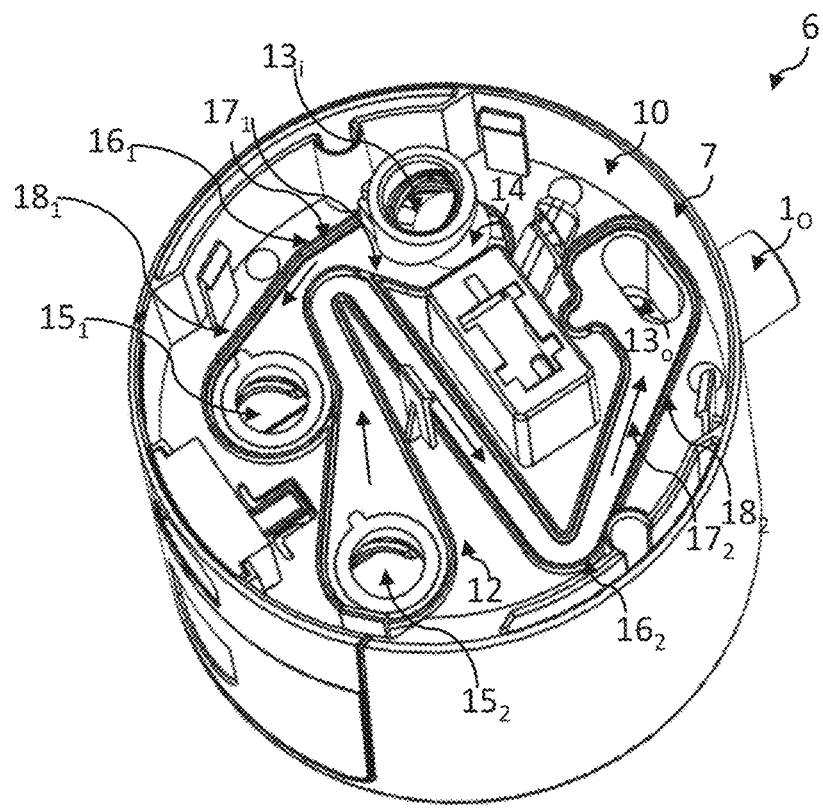
FIG. 2A shows the main components of a connecting chamber, forming part of the humidifier.

FIG. 2A shows the structure of the connecting chamber 10 in detail. The latter forms an interface between the ventilation chamber 5 and the humidification chamber 20. It also forms an interface between the humidification chamber 20 and the air outlet $1_o$ of the device. The connecting chamber 10 extends along the axis Z, between a separating wall 12 and an upper wall 11. Between the separating wall 12 and the upper wall 11, the connecting chamber 10 is delimited by the lateral wall 7. In this way, the lateral wall 7 connects the separating wall 12 to the upper wall 11. The upper wall 11 separates the ventilation chamber 5 and the connecting chamber 10.

The separating wall 12 separates the connecting chamber 10 and the humidification chamber 20. The humidification chamber 20 extends along the axis Z between the bottom 3 and the separating wall 12. Between the bottom 3 and the separating wall 12, the humidification chamber 20 is delimited by the lateral wall 7. In this way, the lateral wall 7 connects the bottom to the separating wall 12. In the example shown, the separating wall 12 is parallel to the bottom 3. This is also the case for the upper wall 11.

An intake opening $13_i$ is made through the upper wall 11, so as to allow the air flowing from the ventilation chamber 5 to enter the connecting chamber 10.

The separating wall 12 has a first opening $15_1$ and a second opening $15_2$, the first opening and the second opening making it possible for the air to pass from one side to the other of the separating wall 12, from the connecting chamber 10 to the humidification chamber 20 and vice versa.

The connecting chamber 10 has a first channel $16_1$, extending from the intake opening $13_i$ to the first opening $15_1$. Thus, during the operation of the device 1, the air enters the humidifier 6 via the intake opening $13_o$, and then flows along the first channel $16_1$ as far as the first opening $15_1$. The first channel $16_1$ is delimited by the separating wall 12 and the upper wall 11. It is also delimited by a first lateral wall $17_1$ or first lateral walls $17_1$, extending between the separating wall 12 and the upper wall 11. In the example shown, each first lateral wall $17_1$ is inserted on a seal $18_1$ forming a closed contour around the intake opening $13_i$ and the first opening $15_1$. Through the base plane XY of the device, that is to say perpendicularly to the transverse axis Z, the section of the first channel $16_1$ is not uniform. Thus, the first channel $16_1$ has a constriction between the intake opening $13_i$ and the first opening $15_1$. This makes it possible to reduce the noise generated by the air flow.

The constriction in the first channel $16_1$ allows the arrangement of a bend of a second channel $16_2$, described later on.

Figure 2B:
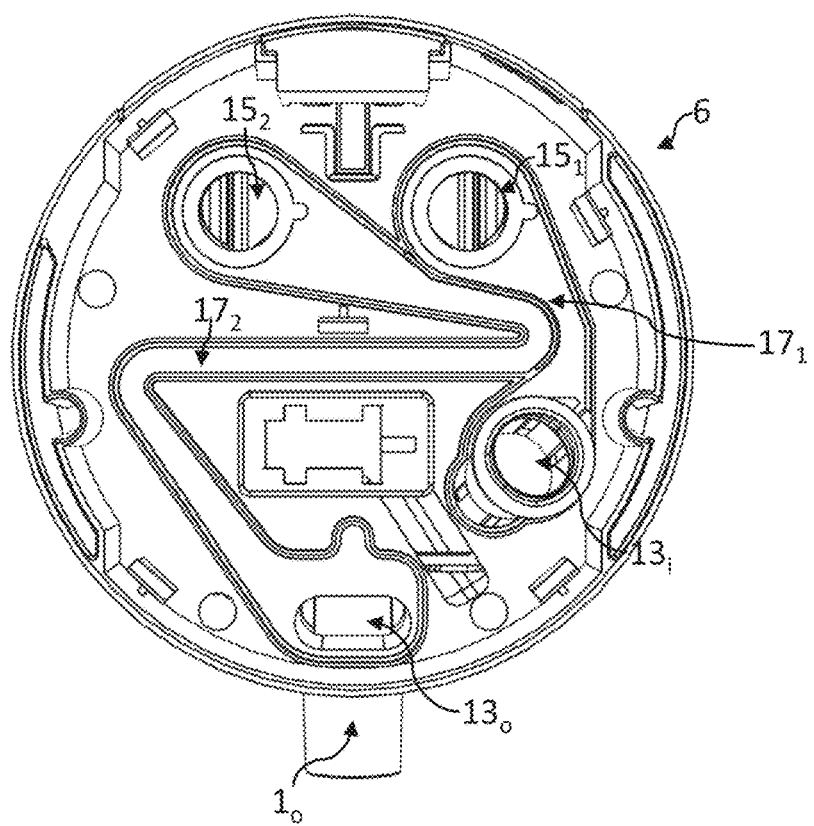
FIG. 2B is a top view, through a plane XY, of the connecting chamber.
Figure 2C:
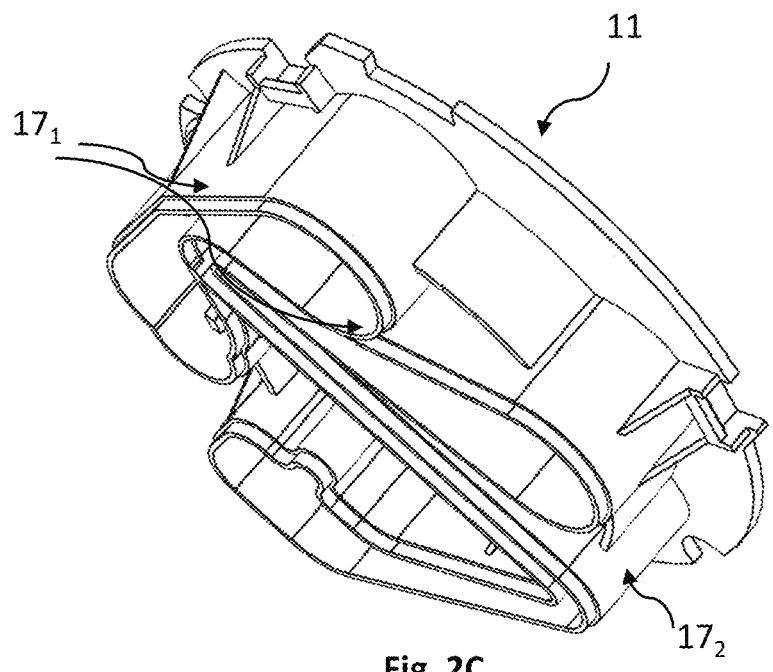
FIG. 2C shows the upper wall of the connecting chamber, the latter extending between the separating wall and the ventilation chamber.

Each first lateral wall $17_1$ is preferably secured to the upper wall 11, as shown in FIG. 2C. This simplifies the manufacture of the device.

The connecting chamber 10 has a second channel $16_2$, extending between the second opening $15_2$ and the exhaust opening $13_o$. Thus, during the operation of the device 1, the air leaves the humidification chamber 20 via the second opening $15_2$, and then flows along the second channel $16_2$ as far as the exhaust opening $13_o$. The second channel $16_2$ is delimited by the separating wall 12 and the upper wall 11. It is also delimited by a second lateral wall $17_2$ or second lateral walls $17_2$, extending between the separating wall 12 and the upper wall 11. In the example shown, each second lateral wall $17_2$ is inserted on a seal $18_2$ forming a closed contour around the exhaust opening $13_o$ and the second opening $15_2$. Each second lateral wall $17_2$ is preferably secured to the upper wall 11, as shown in FIG. 2C.

The upper wall 11 is preferably removable, so that it can be easily withdrawn. This allows access to the interior of the connecting chamber 10. This facilitates cleaning of the connecting chamber, thereby improving hygiene when the device is being used. This also facilitates the maintenance of the device. In the example shown, the lateral walls delimiting the first channel and the second channel are secured to the upper wall 11: they then form, with the latter, one and the same single-piece part, as shown in FIG. 2C.

As can be seen in FIGS. 2A to 2C, the second channel $16_2$ has at least one bend, and preferably multiple bends, between the exhaust opening $13_o$ and the second opening $15_2$. It is preferable if at least one bend, and preferably each bend, defines an angle greater than 90°.

The presence of bends in the second channel $16_2$ makes it possible to avoid the intake of water into the duct 8, downstream of the air outlet $1_o$ of the device, in the event of misuse or accidental overturning of the device. The bends form baffles, which hinder a possible flow of water toward the exhaust opening $13_o$.

Figure 2D:
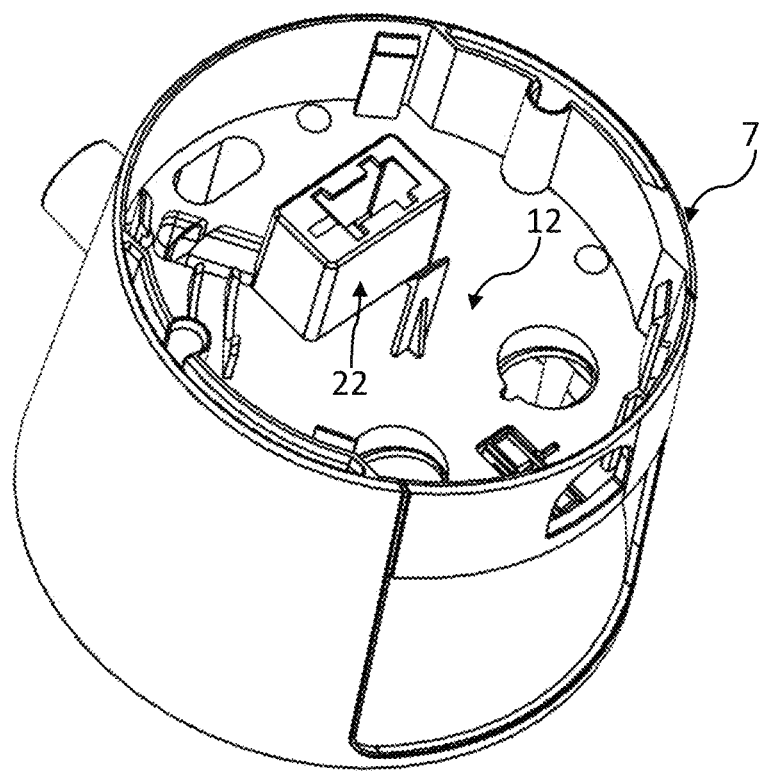
FIG. 2D shows the separating wall, separating the connecting chamber from the humidification chamber.

FIG. 2D shows the separating wall 12. The separating wall 12 has a recess 22, extending toward the interior of the connecting chamber 10. This recess forms a free volume for arranging an electrical connector for electrical connection of components equipping the humidifier. It may be a hotplate, described later on, which forms part of the humidification chamber. It may also be an inclinometer, described later on, which is configured to stop the fan in the event of excessive inclination of the device.

In the example shown, the intake opening $13_i$ is associated with a shutter 14, configured to pass from an open position, permitting the passage of air through the intake opening, to a closed position, blocking the passage of air. The shutter is configured to pass from the open position to the closed position when the device 1 deviates from a reference position, corresponding to normal use of the device. The reference position corresponds to the position shown in FIG. 1A, specifically the bottom 3 arranged below the upper end 4, the transverse axis Z being vertical, to within an angular tolerance. The angular tolerance may be, for example, +/−250 or +/−45°, or even +/−60°.

When the device deviates from its reference position, for example in the event of overturning, the shutter switches to the closed position, thereby blocking the passage of any fluid through the intake opening $13_i$. This makes it possible to avoid water, contained in the reservoir of the humidifier, flowing through the intake opening $13_i$ into the ventilation chamber 5. This then avoids deterioration of the ventilation chamber 5 and, for example, the fan, caused by the presence of water. Possible electrical problems are also avoided, the ventilation chamber having electronic components, for example on a control board of the fan.

Figure 2E:
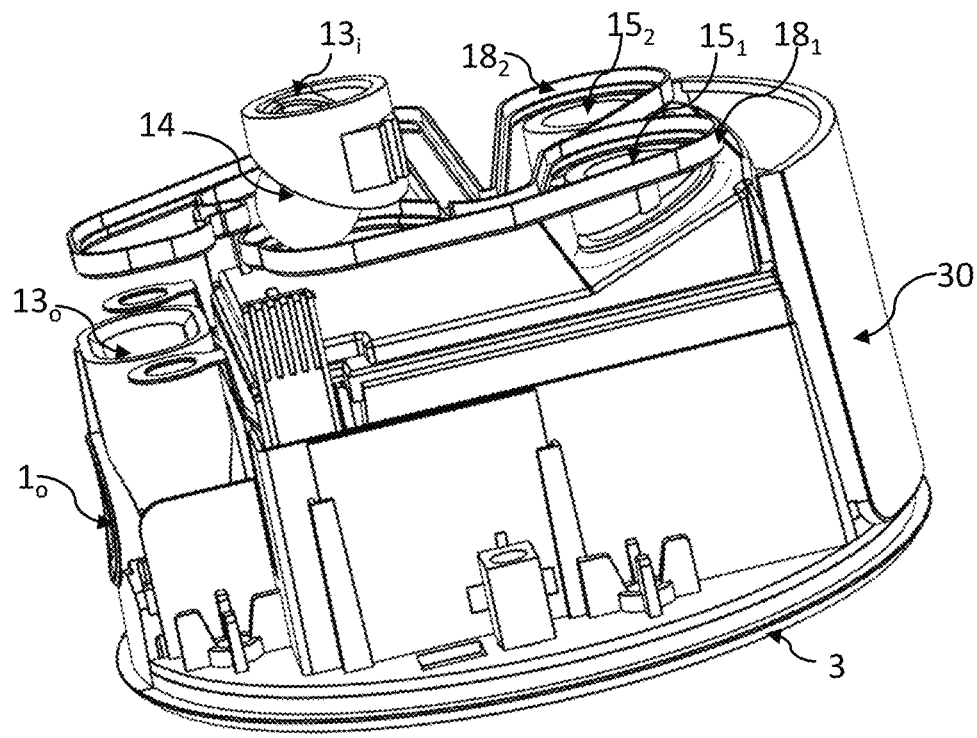
FIG. 2E shows the humidification chamber, and also a shutter associated with an intake opening and arranged in the connecting chamber.

In the example shown, the shutter 14 takes the form of a ball, resting on a support when the device is held in the reference position. The shutter 14 can be seen in FIGS. 2A and 2E. In the event of excessive inclination, under the effect of gravity, the ball (shutter 14) slides against the intake opening $13_i$ so as to block it. The shutter is then in the closed position. As a variant, an inclinometer may be arranged in the device 1, so as to measure an inclination of the device with respect to the reference position. Depending on the inclination of the device, a shutter, of the valve or solenoid valve type, is electronically controlled so as to shift between the open position and the closed position. In all scenarios, when the device is in a reference position, the shutter switches from the closed position to the open position.

In addition or as an alternative to a simple shutter actuated by gravity, the device may have an inclinometer so as to generate an audible and/or visual alarm to the user. This allows the user to wake up before they perceive a feeling of lacking air due to the passage of the shutter into the closed position. According to one embodiment, when the inclination of the device is excessive, the device has a circuit breaker so as to stop the fan. The inclinometer may operate using gravity, or have a motion sensor, for example an accelerometer.

The shutter 14 may also be arranged at the first opening $15_1$ instead of the intake opening $13_i$. A shutter may also be arranged at the second opening $15_2$, or the exhaust opening $13_o$, so as to avoid a flow of water into the duct 8.

Figure 3A:
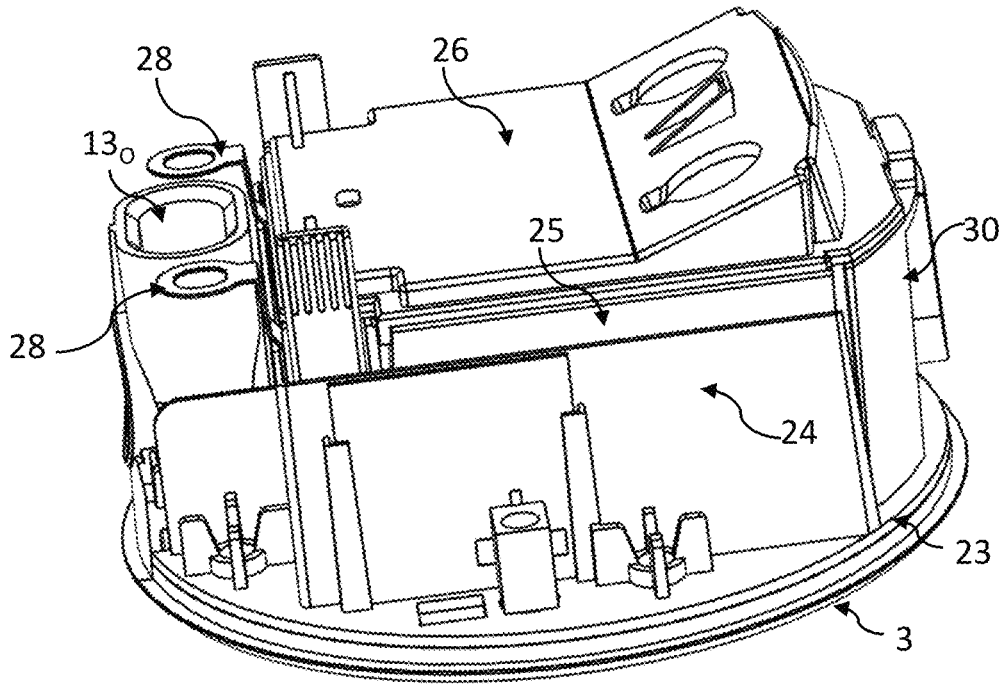
FIG. 3A is a general view of the humidification chamber.
Figure 3B:
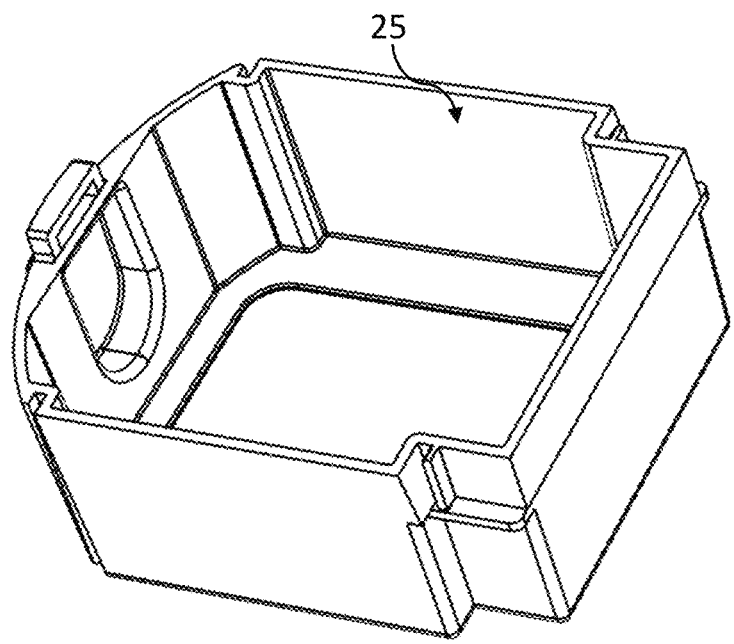
FIG. 3B shows a reservoir of the humidifier, intended to contain water.
Figure 3C:
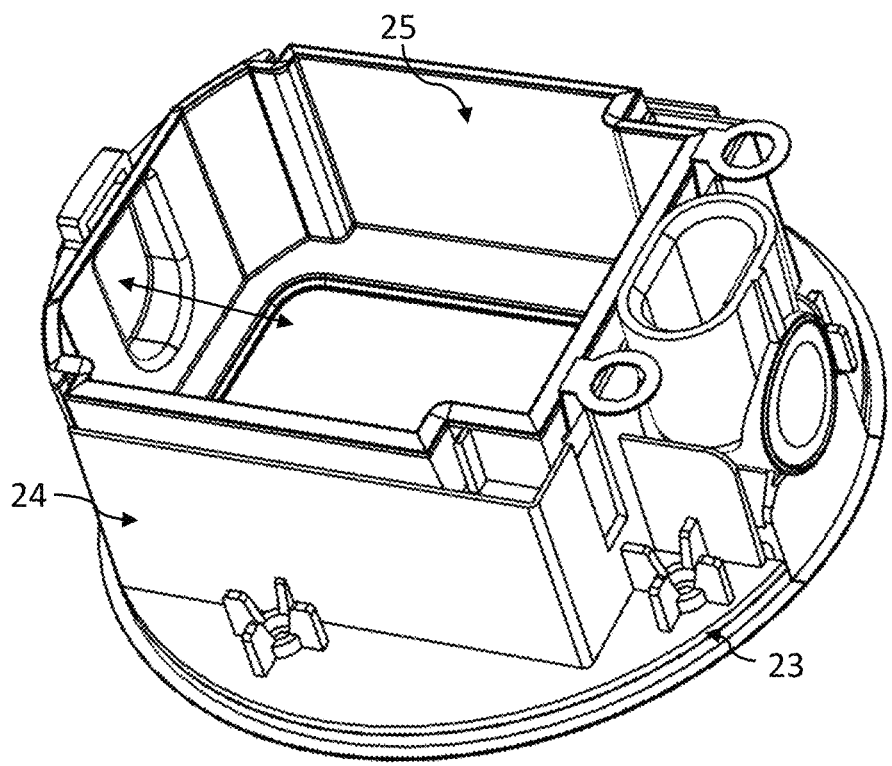
FIG. 3C illustrates the arrangement of the reservoir with respect to a frame, in the humidification chamber.

FIGS. 3A to 3C relate to the humidification chamber 20. The latter has a reservoir 25, resting on a frame 24. The reservoir 25 is configured to contain water. During use of the device, the air enters the humidification chamber 20 through the first opening $15_1$ and leaves it again through the second opening $15_2$. In the course of its flow in the humidification chamber 20, the air flows through the reservoir 25, and above the water it contains. It is thus humidified, before leaving the humidification chamber 20 and being directed through the connecting chamber 10 toward the exhaust opening $13_o$ and then the air outlet $1_o$ of the device. The reservoir may be arranged under a cover 26, the latter having openings, for example made facing the first opening and the second opening, and permitting the passage of the air.

The humidification chamber 20 may have a hotplate 23, configured to heat the water in the reservoir 25. The heating temperature is, for example, between 40° C. and 80° C. The hotplate 23 is preferably mounted on a spring, so as to be pressed against the reservoir 25.

The reservoir 25 is preferably removable from the frame 24. It may, in particular, be movable in translation relative to the frame 24, so as to be able to be withdrawn from the humidification chamber 20 or inserted into the latter. A spring mechanism 28 facilitates the withdrawal of the reservoir. The springs are set when the reservoir is introduced into the frame 24. Under the effect of a pressure exerted on a slider 27, shown in FIG. 1C, the springs expand and facilitate a movement of the reservoir 25 in translation relative to the frame 24. The reservoir is moved in translation relative to the frame through the base plane XY, that is to say orthogonally to the transverse axis Z. In FIG. 3C, the double arrow symbolizes the direction of movement in translation. The reservoir is connected to the flap 30 shown in FIGS. 1C and 1D. The flap 30 is part of the lateral wall 7. It allows the reservoir 25 to be gripped. The fact that the reservoir 25 is removable by a simple movement in translation assists the filling with water. It also allows the reservoir to be cleaned, thereby making the use of the device more hygienic. The result is a device that is particularly simple to use and to clean.

Figure 4:
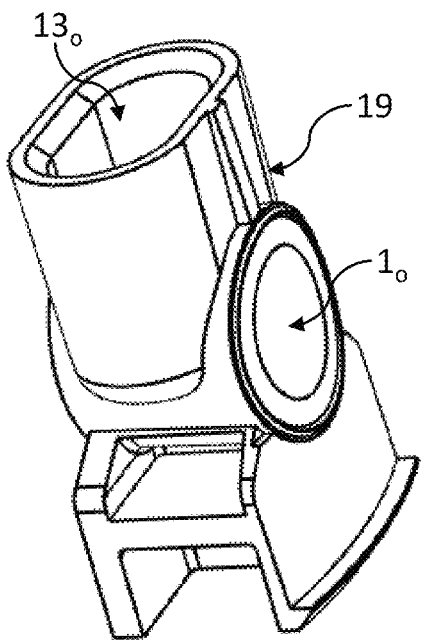
FIG. 4 shows an exhaust channel, extending between the connecting chamber and an outlet of the device.

FIG. 4 shows the exhaust channel 19, extending between the exhaust opening $13_o$ and the air outlet $1_o$ of the device. The exhaust channel 19 is angled, which helps to reduce the noise of the air flow. The exhaust channel 19 may be produced, for example, by molding, from a flexible material, for example an elastomer. This also helps to limit the noise of the air flow. Opposite the exhaust opening $13_o$, the exhaust channel 19 leads into the air outlet $1_o$ of the device. The exhaust channel 19 is preferably removable, thereby making it easier to clean the device.

Figure 5:
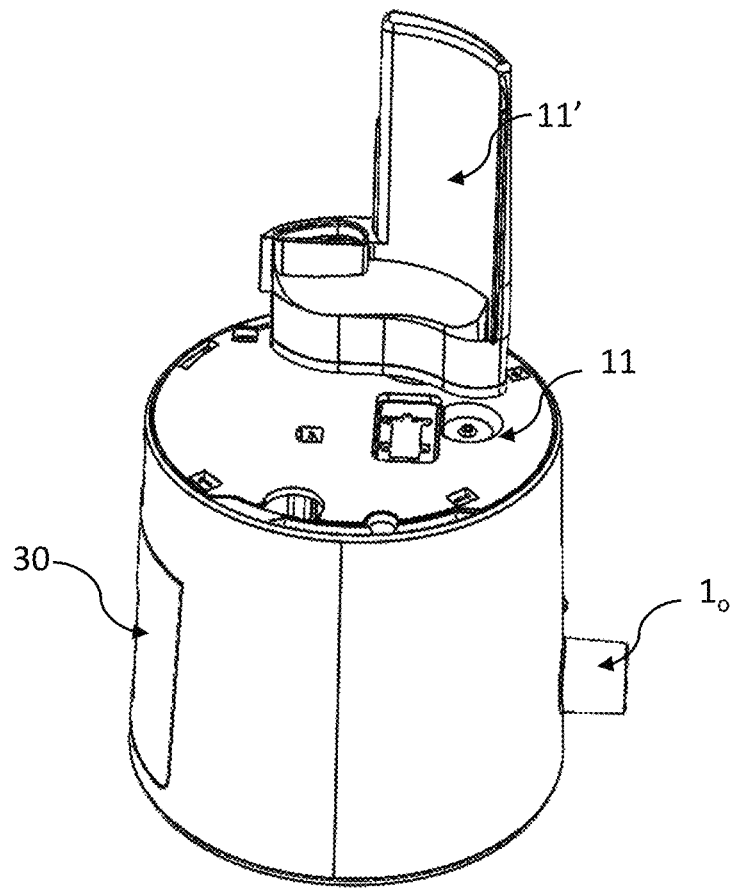
FIG. 5 illustrates one embodiment of the device.

FIG. 5 shows an embodiment in which the device has a buffer reservoir 11', forming a free volume. The buffer reservoir is formed in the upper wall 11. It is open onto the connecting chamber 10. It is arranged between the connecting chamber 10 and the ventilation chamber 5. If the device is overturned, or is inclined excessively, the buffer reservoir 11' is arranged to receive the water pouring from the reservoir 25, so as to avoid the water entering the ventilation chamber. The buffer reservoir 11' is advantageously arranged facing the first channel $16_1$, for example, facing the intake opening $13_i$ or facing the first opening $15_1$.

When the device is in operation, the humidifier 6 forms a base on the ventilation chamber 5. The latter has an electric power supply and electronic control boards. The ventilation chamber 5 may be as described in the application FR1901084 filed on Feb. 4, 2019, issued as FR3092253B1 on Feb. 19, 2021. During operation, the humidifier 6 is arranged below the ventilation chamber 5, the electric power supply and the electronic control boards. In the event of a leak in the water reservoir, the water flows by gravity without reaching the ventilation chamber. This results in enhanced operational safety.

The invention claimed is:

1. A respiratory ventilation device, intended to send an air flow, generated by a fan, into a duct, the duct extending between the device and a respiratory mask, intended to be worn by a user, the device extending between a lower end, forming a bottom, and an upper end, the device having:
   a ventilation chamber, containing the fan; and
   a humidifier, connected to the ventilation chamber, and intended to humidify the air blown in by the fan, the humidifier having a water reservoir intended to accommodate water;
   the humidifier having:
   a connecting chamber, adjacent to the ventilation chamber, and comprising:
      an intake opening, leading out of the ventilation chamber; and
      an exhaust opening, leading into an exhaust channel, the exhaust channel being configured to be attached to the duct;
   a humidification chamber, having the water reservoir; and
   a first opening and a second opening, separate from one another, formed between the connecting chamber and the humidification chamber;
   wherein:
   the connecting chamber extends between the humidification chamber; and the ventilation chamber; and
   the device has a separating wall extending between the connecting chamber and the humidification chamber, the first opening and the second opening being made in the separating wall, the separating wall being arranged such that:
      the humidification chamber extends between the bottom and the separating wall; and
      the connecting chamber extends between the separating wall and the ventilation chamber.

2. The device of claim 1, having an annular lateral wall, connecting the lower end to the upper end, such that the connecting chamber, the humidification chamber and the ventilation chamber are delimited by the annular lateral wall.

3. The device of claim 1, wherein the connecting chamber defines a first channel between the intake opening and the first opening, and also a second channel between the second opening and the exhaust opening, such that:
   the first channel is arranged to direct air from the ventilation chamber through the intake opening to the humidification chamber, through the first opening; and
   the second channel is arranged to direct air from the humidification chamber through the second opening to the exhaust opening.

4. The device of claim 3, wherein the second channel defines a path through the connecting chamber, the path having multiple bends between the second opening and the exhaust opening.

5. The device of claim 3, wherein:
the first channel extends between two first transverse walls, each first transverse wall extending between the separating wall and an upper wall of the connecting chamber; and/or
the second channel extends between two second transverse walls, each second transverse wall extending between the separating wall and the upper wall of the connecting chamber.

6. The device of claim 5, wherein:
the connecting chamber extends between the separating wall and the upper wall of the connecting chamber; and
each first transverse wall and/or each second transverse wall extends from the upper wall of the connecting chamber.

7. The device of claim 1, having a shutter, and wherein an opening, chosen from among the intake opening and the first opening, is associated with the shutter, the shutter being configured to pass from an open position, in which the opening is open, and a closed position, in which the opening is closed, when the device is tilted beyond a critical inclination with respect to a reference position of the device.

8. The device of claim 7, wherein the shutter is configured to switch between the open position and the closed position by gravity.

9. The device of claim 1, having an inclinometer, configured to measure an angle of inclination of the device with respect to a reference position of the device, the inclinometer being connected to a circuit breaker, the inclinometer being configured to activate the circuit breaker so as to interrupt operation of the fan when the device is tilted beyond a critical inclination with respect to a reference position of the device.

10. The device of claim 2, wherein the annular lateral wall extends about a transverse axis, extending between the bottom and the upper end.

11. The device of claim 10, wherein the annular lateral wall is cylindrical or frustoconical.

12. The device of claim 1, wherein the water reservoir extends, in the humidification chamber, between the bottom of the device and the separating wall.

13. The device of claim 1, wherein the water reservoir is removable, such that it can be withdrawn from or inserted into the humidification chamber.

14. The device of claim 1, wherein the water reservoir is movable in translation with respect to a frame, so as to be able to be withdrawn from or inserted into the humidification chamber by being moved in translation parallel to the bottom.

15. The device of claim 1, wherein the exhaust opening opens into an angled exhaust channel.

16. The device of claim 1, wherein the humidifier is removable so as to be able to be separated from the ventilation chamber.

17. The device of claim 1, wherein:
the connecting chamber is delimited by an upper wall, the upper wall being adjacent to the ventilation chamber; and
the upper wall is removable.

* * * * *